United States Patent [19]

O'Donnell

[11] Patent Number: 5,121,364

[45] Date of Patent: Jun. 9, 1992

[54] TIME FREQUENCY CONTROL FILTER FOR AN ULTRASONIC IMAGING SYSTEM

[75] Inventor: Matthew O'Donnell, Ann Arbor, Mich.

[73] Assignee: General Electric Company, Schenectady, N.Y.

[21] Appl. No.: 741,874

[22] Filed: Aug. 7, 1991

[51] Int. Cl.⁵ .............................................. G01S 15/00
[52] U.S. Cl. .................................... 367/098; 367/11; 367/900; 128/660.06
[58] Field of Search ............... 367/98, 900, 7, 11; 128/660.06; 73/631; 364/413.25

[56] References Cited

U.S. PATENT DOCUMENTS

| | | | |
|---|---|---|---|
| 4,154,113 | 5/1979 | Engeler | 73/626 |
| 4,155,258 | 5/1979 | Engeler et al. | 73/626 |
| 4,155,259 | 5/1979 | Engeler | 73/626 |
| 4,155,260 | 5/1979 | Engeler et al. | 73/626 |
| 4,180,790 | 12/1979 | Thomas | 367/7 |
| 4,470,303 | 9/1984 | O'Donnell | 73/602 |
| 4,662,223 | 5/1987 | Riley et al. | 73/626 |
| 4,669,314 | 6/1991 | Margrane | 73/610 |
| 4,809,184 | 2/1989 | O'Donnell et al. | 364/413.25 |
| 4,835,689 | 5/1989 | O'Donnell | 364/413.25 |
| 4,839,652 | 6/1989 | O'Donnell et al. | 341/122 |
| 4,896,287 | 1/1990 | O'Donnell et al. | 364/754 |
| 4,983,970 | 1/1991 | O'Donnell et al. | 341/122 |
| 5,014,712 | 5/1991 | O'Donnell | 128/661.01 |

OTHER PUBLICATIONS

S. C. Leavitt et al., "A Scan Conversion Algorithm for Displaying Ultrasound Images", Hewlett-Packard Journal, Oct. 1983, pp. 30-34.

Oppenheim and Schafer, "Digital Signal Processing", Prentice Hall, 1975, pp. 237-269.

Primary Examiner—Daniel T. Pihulic
Attorney, Agent, or Firm—Marvin Snyder; James C. Davis, Jr.

[57] ABSTRACT

A phased array sector scanning ultrasonic imaging system produces digitized baseband samples of the received ultrasonic echo signals amplified by a time gain control (TGC) to compensate for dispersion losses in the media in which the ultrasonic signals propagate. A time frequency control filter employs the same TGC control signal to calculate a phase shift correction as well as the coefficients which determine the characteristics of a bandpass filter such that the frequency dependent dispersion losses in the ultrasonic echo signals are compensated.

10 Claims, 9 Drawing Sheets

TIME FREQUENCY CONTROL FILTER FOR AN ULTRASONIC IMAGING SYSTEM

BACKGROUND OF THE INVENTION

This invention relates to coherent imaging systems using vibratory energy, such as ultrasound and the like, and, in particular, to ultrasound imaging in which frequency shifts resulting from propagation of ultrasound through the body are corrected.

There are a number of modes in which ultrasound can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of the amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude or time-of-flight of the ultrasound reflected from the object back to the receiver ("refraction", "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the refractors in the object and the time delay is proportional to the range of the refractors from the transducer. In the so-called "B-scan" method, the transducer transmits a series of ultrasonic pulses as it is scanned across the object along a single axis of motion. The resulting echo signals are recorded as with the A-scan method and either their amplitude or time delay is used to modulate the brightness of pixels on a display. With the B-scan method, enough data are acquired from which an image of the refractors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage is applied, the piezoelectric elements change in size at a frequency corresponding to that of the applied voltage. When a voltage pulse is applied, the piezoelectric element emits an ultrasonic wave into the media to which it is coupled at the frequencies contained in the excitation pulse. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is disposed to the rear of the piezoelectric element to absorb ultrasonic waves that emerge from the back side of the element so that they do not interfere. A number of such ultrasonic transducer constructions are disclosed in U.S. Pat. Nos. 4,217,684, 4,425,525, 4,441,503, 4,470,305 and 4,569,231, all of which are assigned to the instant assignee.

When used for ultrasound imaging, the transducer typically has a number of piezoelectric elements arranged in an array and driven with separate voltages (apodizing). By controlling the time delays (or phase) and amplitude of the applied voltages, the ultrasonic waves produced by the piezoelectric elements (transmission mode) combine to produce a net ultrasonic wave focused at a selected point. By controlling the time delays and amplitude of the applied voltages, this focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delays (and/or phase shifts) and gains to the signal from each transducer array element.

This form of ultrasonic imaging is referred to as "phased array sector scanning", or "PASS". Such a scan is comprised of a series of measurements in which the focused ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along a scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258, 4,155,260, 4,154,113, 4,155,259, 4,180,790, 4,470,303, 4,662,223, 4,669,314 and 4,809,184, all of which are assigned to the instant assignee.

Ultrasonic imaging systems must compensate for the fact that the ultrasonic energy reflected from objects will change as a function of the object range. For example, the ultrasonic energy reflected from a remote object will be attenuated more than the energy reflected from an object at close range. This is due to the dispersive properties of the media in which the sound propagates, and if not compensated, it results in an image which grows darker with range. As a result, state-of-the-art ultrasonic imaging systems include time gain control (TGC) circuits which provide increased amplification of the received ultrasonic echo signals as a function of time, or range. The gain of the TGC circuit may be manually adjusted by the operator to compensate the image at different ranges, or the TGC gain signal may be computed by the system as described in U.S. Pat. No. 4,470,303, issued Sept. 11, 1984 and entitled "Quantitative Volume Backscatter Imaging". As the ultrasonic wave propagates through the dispersive media, it not only is attenuated in amplitude, but is also shifted in frequency. The signals at frequencies within the bandwidth of the ultrasonic pulse are attenuated at different rates, with the higher frequencies experiencing higher rates of attenuation. As a result, the echo signal is softened as it propagates through the body and a different signal spectrum is received for every range. In a baseband ultrasonic imaging system this means that the primary energy components in the received echo signal move away from the baseband frequency with increasing range.

SUMMARY OF THE INVENTION

The present invention relates to a time frequency control filter for an ultrasonic imaging system, and particularly, a filter responsive to the time gain control signal to compensate the received echo signal for frequency dependent propagation losses. The time frequency control filter includes a phase rotator which receives the in-phase and quadrature components of the received echo signal and imparts a phase shift thereto in response to a phase shift command signal. A phase shift command processor is responsive to the amplitude of the system's time gain control signal to produce the phase shift command signal which substantially compensates for the frequency shift in the received echo signal due to propagation losses.

Another aspect of the invention is the addition of a bandpass filter at the output of the phase rotator also responsive to the system time gain control signal. This filter includes a high pass filter fully employed at short ranges where the received echo signal has a high signal-to-noise ratio (SNR), and a low pass filter fully employed at long ranges where the SNR is low. This improves image resolution at close ranges and it improves penetration and image quality at long ranges.

A general object of the invention is to provide a time frequency control filter which compensates the received ultrasonic echo signal for frequency dependent propagation attenuation. The frequency shift is corrected by a simple phase rotator circuit and the amount of the phase rotation is determined by the amplitude of the system time gain control signal. The same time gain control signal is employed to control the operation of the low pass and high pass filters, thus avoiding the need to calculate separate control signals.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 2A and 2B are graphical illustrations of the signal in any of the channels of transmitter 50 of FIG. 2;

DESCRIPTION OF THE PREFERRED EMBODIMENT

Figure 1:
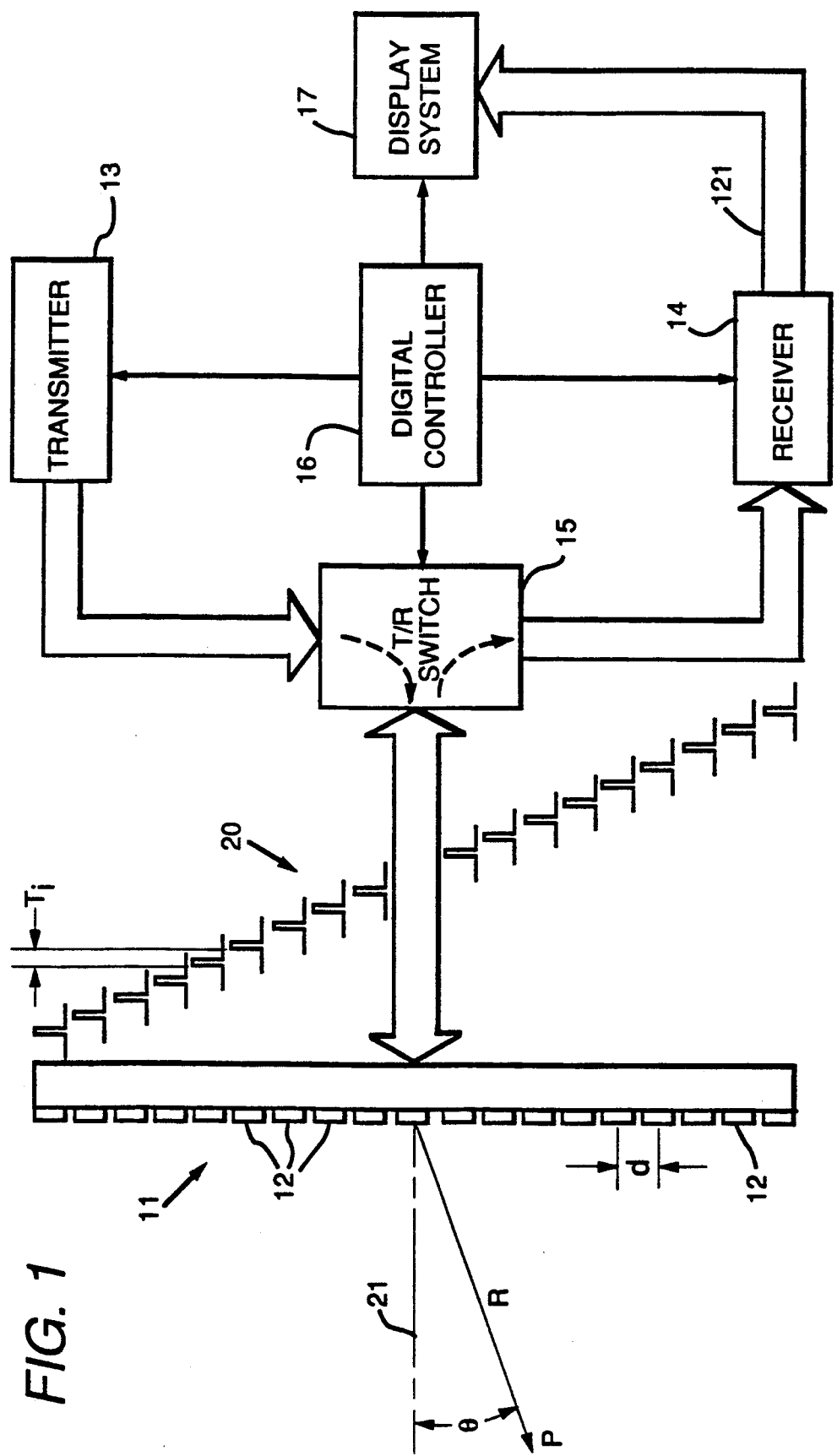
FIG. 1 is a block diagram of an ultrasonic imaging system which employs the present invention.

Referring particularly to FIG. 1, an ultrasonic imaging system includes a transducer array 11 comprised of a plurality of separately driven elements 12 which each produce a burst of ultrasonic energy when energized by a pulse produced by a transmitter 13. The ultrasonic energy reflected back to transducer array 11 from the subject under study is converted to an electrical signal by each transducer element 12 and applied separately to a receiver 14 through a set of switches 15. Transmitter 13, receiver 14 and switches 15 are operated under control of a digital controller 16 responsive to commands by a human operator. A complete scan is performed by acquiring a series of echoes in which transmitter 13 is gated on momentarily to energize each transducer element 12, switches 15 are then gated on to receive the subsequent echo signals produced by each transducer element 12, and these separate echo signals are combined in receiver 14 to produce a single echo signal which is employed to produce a pixel or a line in an image on a display 17.

Transmitter 13 drives transducer array 11 such that the ultrasonic energy produced is directed, or steered, in a beam. A B-scan can therefore be performed by moving this beam from point-to-point rather than physically moving transducer array 11. To accomplish this, transmitter 13 imparts a time delay $(T_i)$ to the respective pulses 20 that are applied to successive transducer elements 12. If the time delay is zero $(T_i=0)$, all the transducer elements 12 are energized simultaneously and the resulting ultrasonic beam is directed along an axis 21 normal to the transducer face and originating from the center of transducer array 11. As the time delay $(T_i)$ is increased, as illustrated in FIG. 1, the ultrasonic beam is directed downward from central axis 21 by an amount $\theta$. The relationship between the time delay increment $T_i$ added successively to each $i^{th}$ signal from one end of the transducer array $(i=1)$ to the other end $(i=n)$ is given by the following relationship:

$$T_i = -(i-(n-1)/2)d \sin\theta/c + (i-(n-1)/2)^2 d^2 \cos^2\theta/2R_Tc + T_0 \quad (1)$$

where d = equal spacing between centers of adjacent transducer elements 12,
c = the velocity of sound in the object under study.
$R_T$ = range at which transmit beam is to be focused.
$T_0$ = delay offset which insures that all calculated values ($T_i$) are positive values.

The first term in this expression steers the beam in the desired angle $\theta$, and the second is employed when the transmitted beam is to be focused at a fixed range. A sector scan is performed by progressively changing time delays $T_i$ in successive excitation. The angle $\theta$ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to differences in the propagation paths between the focal point P and each transducer element 12, however, these echo signals will not occur simultaneously and their amplitudes will not be equal. The function of receiver 14 is to amplify and demodulate these separate echo signals, impart the proper time delay to each and sum them together to provide a single echo signal which accurately indicates the ultrasonic energy reflected from the focal point P located at range R along the ultrasonic beam oriented at the angle $\theta$.

To simultaneously sum the electrical signals produced by the echoes from the focal point P, time delays are introduced into each separate transducer element channel of the receiver. In the case of linear array 11, the delay introduced in each channel may be divided into two components, one component referred to as a beam steering time delay, and the other component referred to as a beam focusing time delay. The beam steering and beam focusing time delays for reception are precisely the same delays ($T_i$) as the transmission delays described above. However, the focusing time delay component introduced into each receiver channel is continuously changing during reception of the echo to provide dynamic focusing of the received beam at the range R from which the echo signal emanates. This dynamic focusing delay component is as follows:

$$T_k = (k - (n-1)/2)^2 \, d^2 \cos^2 \theta / 2Rc \qquad (2)$$

R = the range of the focal point P from the center of the array 11;
C = the velocity of sound in the object under study; and
$T_k$ = the time delay associated with the echo signal from the $k^{th}$ element to coherently sum it with the other echo signals.

Under direction of digital controller 16, receiver 14 provides delays during the scan such that steering of receiver 14 tracks with the direction of the beam steered by transmitter 13 and it samples the echo signals at a succession of ranges and provides the proper delays to dynamically focus at points P along the beam. Thus, each emission of an ultrasonic pulse results in acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles ($\theta$) is performed to provide the data necessary for display.

Figure 2:
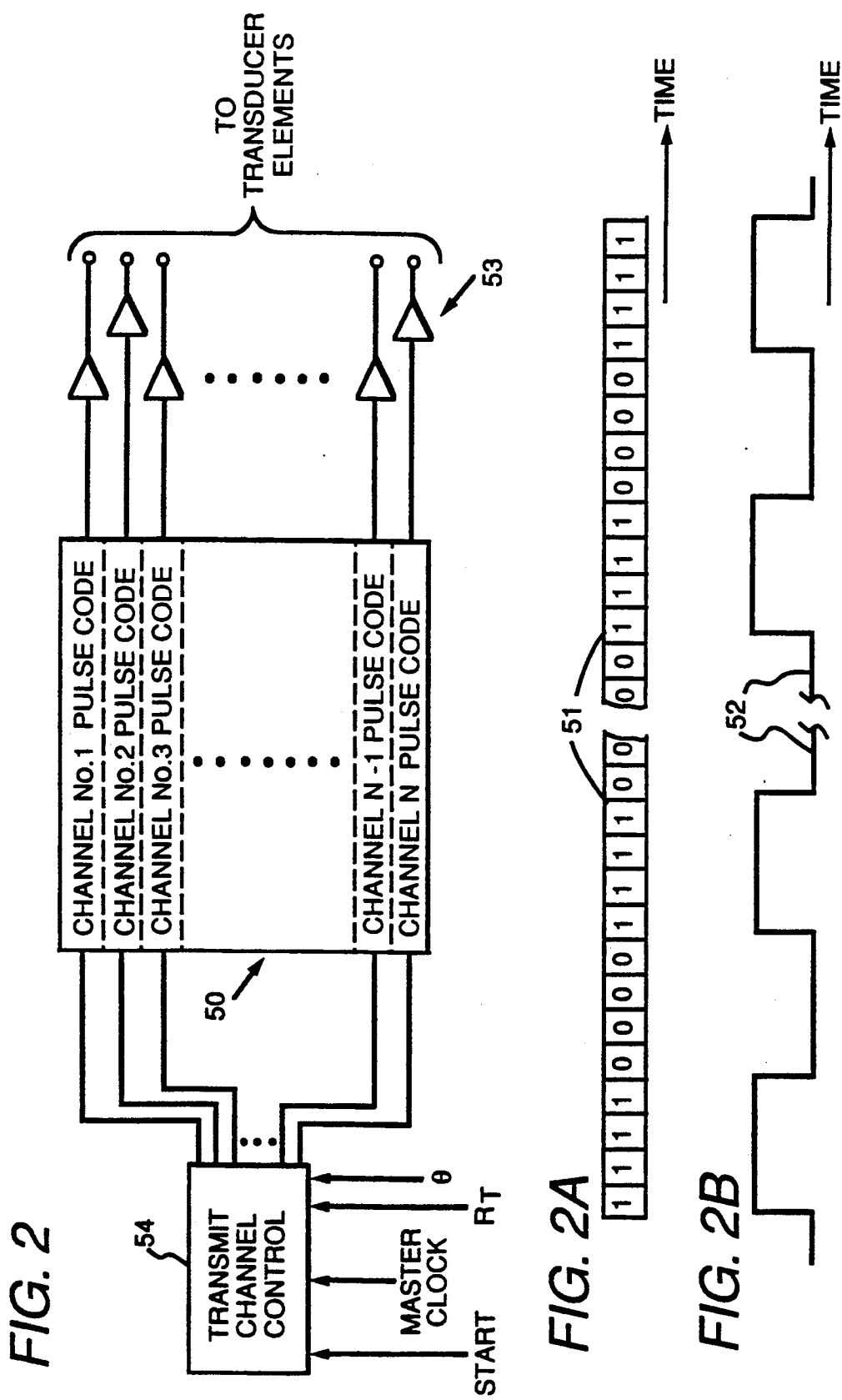
FIG. 2 is a block diagram of a receiver which forms part of the system of FIG. 1.

Referring to FIG. 2 in conjunction with FIG. 1, transmitter 13 includes a set of channel pulse code memories indicated collectively as memories 50. In the preferred embodiment, there are 128 separate transducer elements 12, and therefore, there are 128 separate channel pulse code memories 50. Each pulse code memory 50 is typically a 1-bit by 512-bit memory which stores a bit pattern 51 that determines the frequency of ultrasonic pulse 52 to be produced. In the preferred embodiment, this bit pattern is read out of each pulse code memory 50 by a 40 MHz master clock and applied to a driver 53 which amplifies the signal to a power level suitable for driving transducer 11. In the example shown in FIG. 2A, the bit pattern is a sequence of four "1" bits alternated with four "0" bits to produce a 5 MHz ultrasonic pulse 52. Transducer elements 12 to which these ultrasonic pulses 52 are applied respond by producing ultrasonic energy. If all 512 bits are used, then a pulse of bandwidth as narrow as 40 kHz centered on the carrier frequency (i.e. 5 MHz in the example) will be emitted.

As indicated above, to steer the transmitted beam of ultrasonic energy in the desired direction ($\theta$), pulses 52 for each of the N channels, such as shown in FIG. 2B, must be delayed by the proper amount. These delays are provided by a transmit control 54 which receives four control signals (START, MASTER CLOCK, $R_T$ and $\theta$) from digital controller 16 (FIG. 1). Using the input control signal $\theta$, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, one of four phases of the 40 MHz MASTER CLOCK signal is gated through to the next channel pulse code memory 50 until all N = 128 channels are producing their ultrasonic pulses 52. Each transmit channel 50 is reset after its entire bit pattern 51 has been transmitted and transmitter 13 then waits for the next $\theta$ and next START control signals from digital controller 16. As indicated above, in the preferred embodiment of the invention a complete B-scan is comprised of 128 ultrasonic pulses steered in $\Delta\theta$ increments of 0.70 degrees through a 90 degree sector centered about the central axis 21 (FIG. 1) of the transducer 11.

For a detailed description of transmitter 13, reference is made to commonly assigned U.S. Pat. No. 5,014,712, issued Jan. 28, 1991 and entitled "Coded Excitation For Transmission Dynamic Focusing of Vibratory Energy Beam", incorporated herein by reference.

Figure 3:
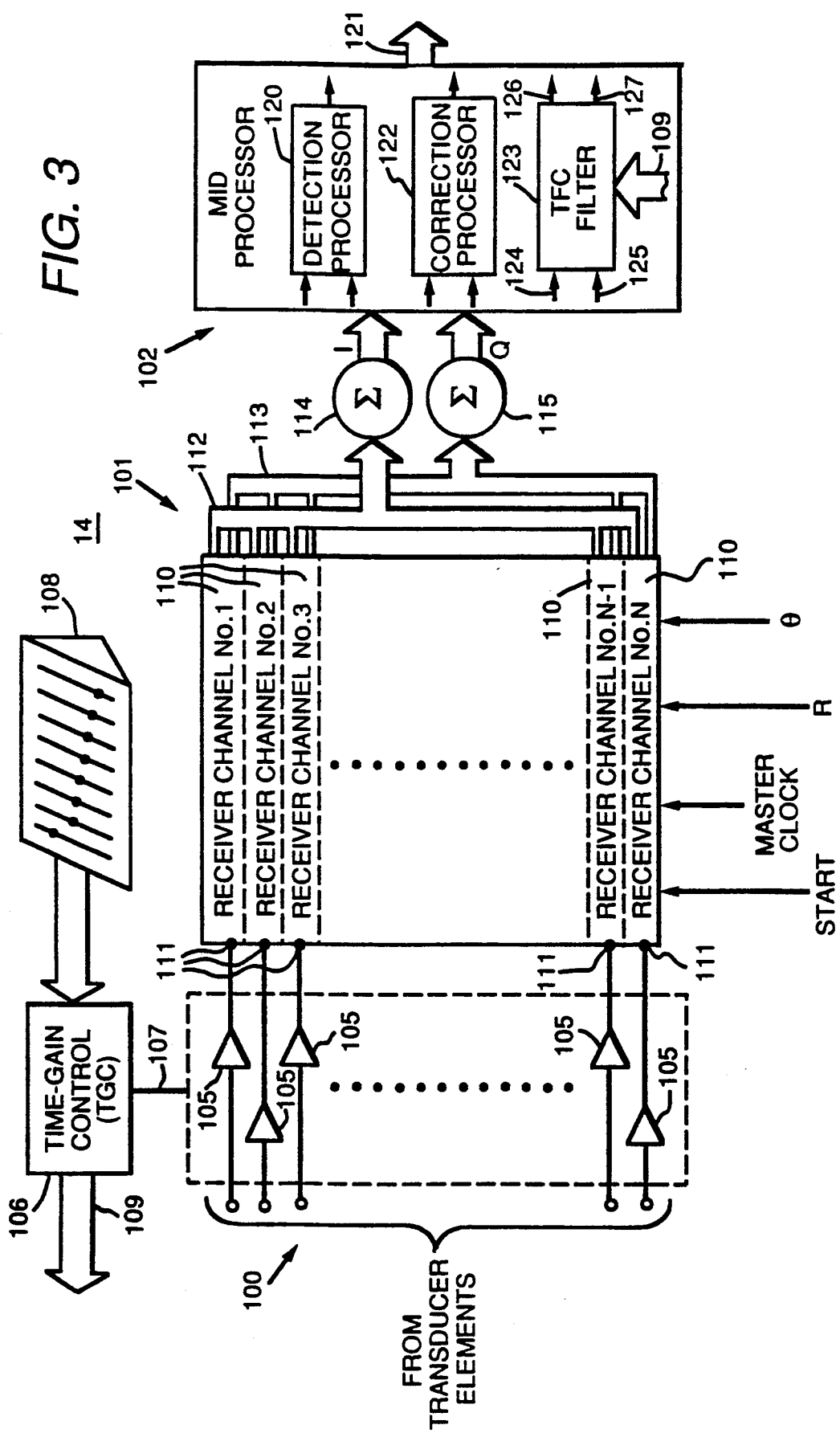
FIG. 3 is a block diagram of a receiver which forms part of the system of FIG. 1.

Referring particularly to FIG. 3 in conjunction with FIG. 1, receiver 14 is comprised of three sections: a time-gain control section 100, a beam forming section 101, and a mid processor 102. Time-gain control section 100 includes an amplifier 105 for each of the N = 128 receiver channels and a time-gain control circuit 106. The input of each amplifier 105 is coupled to a respective one of transducer elements 12 to receive and amplify the echo signal which it receives. The amount of amplification provided by amplifiers 105 is controlled through a control line 107 that is driven by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC control circuit 106. The settings of the eight potentiometers are employed to set the gains of amplifiers 105 during each of the eight respective time intervals so that the echo signal is amplified in ever increasing amounts over the acquisition time interval. As will be described in detail below, the present invention employs a digital form of this same TGC control signal 107 used to set the gain of amplifiers 105. This digital TGC gain control signal is supplied on a bus 109 to the mid processor.

The beam forming section 101 of receiver 14 includes N=128 separate receiver channels 110. As will be explained in more detail below, each receiver channel 110 receives the analog echo signal from one of TGC amplifiers 105 at an input 111, and it produces a stream of digitized output values on an I bus 112 and a Q bus 113. Each of these I and Q values represents a sample of the echo signal envelope at a specific range (R). These samples have been delayed in the manner described above such that when they are summed at summing points 114 and 115 with the I and Q samples from each of the other receiver channels 110, they indicate the magnitude and phase of the echo signal reflected from a point P located at range R on the steered beam ($\theta$). In the preferred embodiment, each echo signal is sampled at equal intervals of about 150 micrometers over the entire range of the scan line (typically 40 to 200 millimeters).

For a more detailed description of receiver 14, reference is made to U.S. Pat. No. 4,983,970 which issued on Jan. 8, 1991 and is entitled "Method And Apparatus for Digital Phase Array Imaging", and which is incorporated herein by reference.

Referring still to FIG. 3, mid processor section 102 receives the beam samples from summing points 114 and 115. The I and Q values of each beam sample are 16-bit digital numbers representing the in-phase and quadrature components of the 1 magnitude of reflected sound from a point (R,$\theta$). Mid processor 102 can perform a variety of calculations on these beam samples, where choice is determined by the type of image to be reconstructed. For example, if a conventional magnitude image is to be produced, a detection process indicated at 120 is implemented in which a digital magnitude M is calculated from each beam sample and output at 121 according to $$M = \sqrt{I^2 + Q^2}.$$

Mid processor 102 may also include a correction processor 122 such as that disclosed in U.S. Pat. No. 4,835,689, issued May 30, 1989 and entitled "Adaptive Coherent Energy Beam Formation Using Phase Conjugation". Such correction processors 122 examine the received beam samples and calculate corrective values that can be used in subsequent measurements by the transmitter 13 and receiver 14 to improve beam focusing and steering. Such corrections are necessary, for example, to account for the non-homogeneity of the media through which the sound from each transducer element travels during a scan.

The present invention is also a correction processor 123, indicated as a TFC (Time Frequency Control) filter. As will be described in detail below, TFC filter 123 receives the I and Q signals from summing points 114 and 115 at its inputs 124 and 125, and produces a corresponding stream of I" and Q" signals at its respective outputs 126 and 127. Typically, outputs 126 and 127 of TFC filter 123 would connect directly to the inputs of detection processor 120 to produce the beam magnitude samples at the processor output 121.

Figure 4:
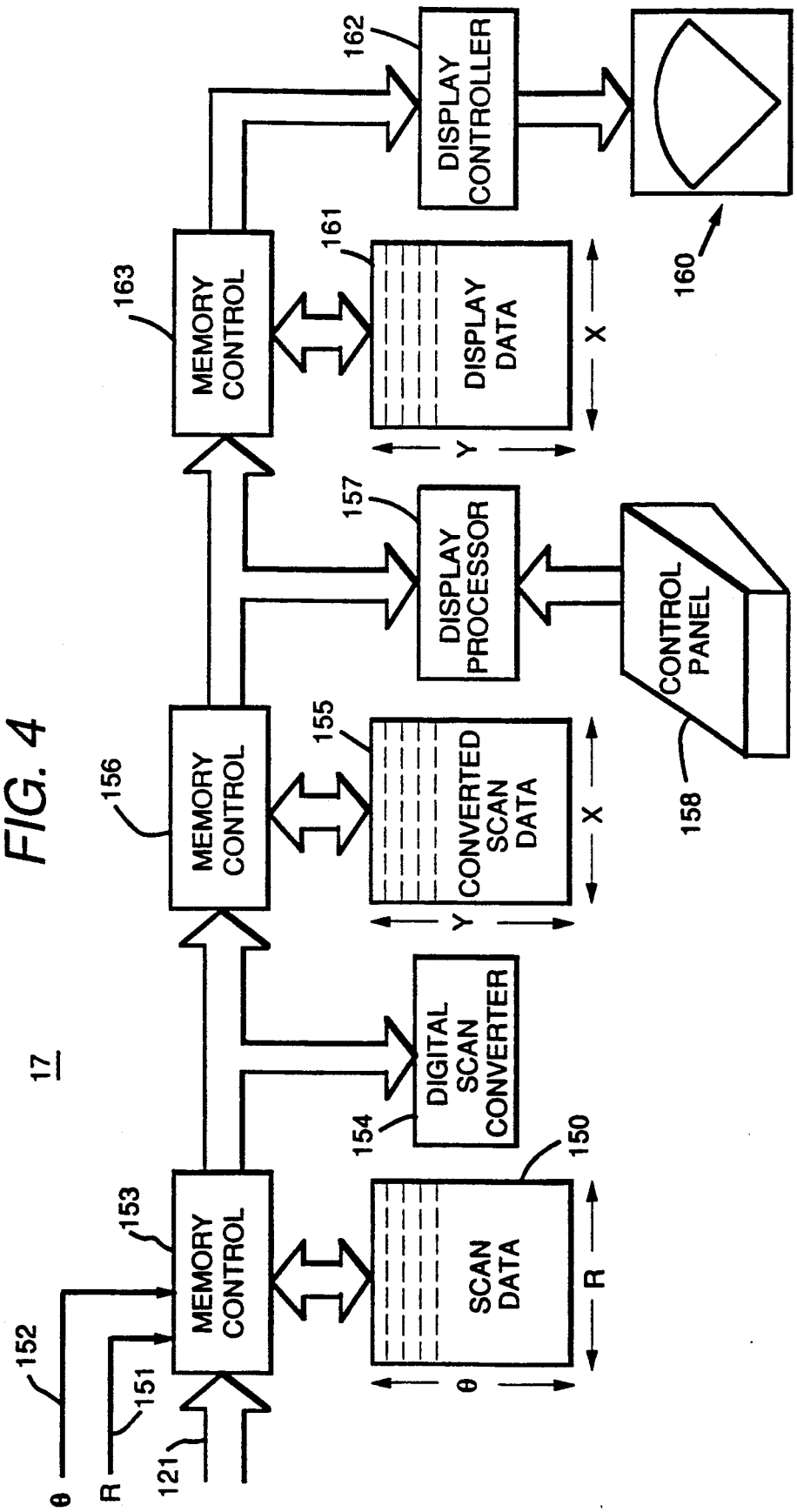
FIG. 4 is a block diagram of a display system which forms part of the system of FIG. 1.

Referring particularly to FIGS. 1 and 4, receiver 14 generates a stream of 8-bit digital numbers at its output 121, which is applied to the input of display system 17. This "scan data" is stored in a memory 150 as an array, with the rows of the scan data array 150 corresponding with the respective beam angles ($\theta$) that are acquired, and the columns of the scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update the scan data array 150.

Referring still to FIG. 4, the scan data in array 150 are read by a digital scan converter 154 and converted to a form producing the desired image. If a conventional B-scan image is being produced, for example, the magnitude values M(R,$\theta$) stored in scan data array 150 are converted to magnitude values M(x,y) which indicate magnitudes at pixel locations (x,y) in the image. Such a polar coordinate to Cartesian coordinate conversion of the ultrasonic image data is described, for example, in an article by Steven C. Leavitt et al in *Hewlett-Packard Journal* October, 1983, pp. 30-33, entitled "A Scan Conversion Algorithm for Displaying Ultrasound Images".

Regardless of the particular conversion made by digital scan converter 154, the resulting image data is written to a memory 155 which stores a two-dimensional array of converted scan data. A memory control 156 provides dual port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced brightness values to a display memory 161.

Display memory 161 is shared with a display controller circuit 162 through a memory control circuit 163, and the brightness values therein are mapped to control the brightness of the corresponding pixels in display 160. Display controller 162 is a commercially available integrated circuit which is designed to operate the particular type of display 160 used. For example, display 160 may be a CRT, in which case display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
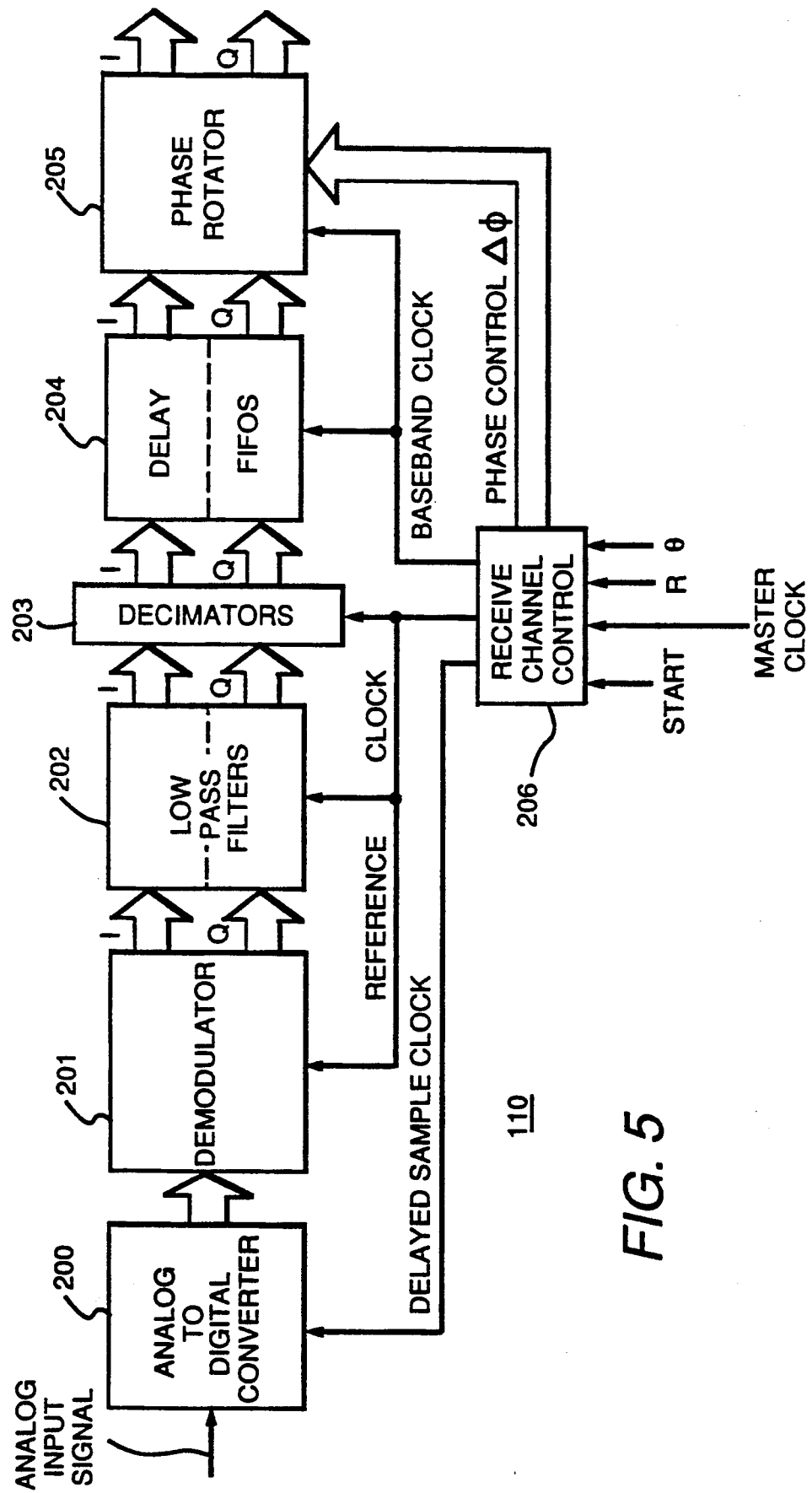
FIG. 5 is a block diagram of a receiver channel which forms part of the receiver of FIG. 3.

As indicated above with reference to FIG. 3, the beam forming section 101 of receiver 14 is comprised of a set of receiver channels 110—one for each element 12 of transducer 11 (FIG. 1). Referring particularly to FIG. 5, each receiver channel is responsive to a START command, a 40 MHz master clock, a range signal (R) and a beam angle signal ($\theta$) from digital controller 16 (FIG. 1) to perform the digital beam forming functions. These include: sampling the analog input signal in an analog-to-digital converter 200, demodulating the sampled signal in a demodulator 201; filtering out the high frequency sum signals produced by demodulator 201 with low pass filters 202; reducing the data rate in decimators 203; and time delaying and phase adjusting the resulting digital data stream in delay FIFOs (i.e., first-in/first-out memories) 204 and phase rotator 205. All of these elements are controlled by a receive channel control 206 which produces the required clock and control signals in response to commands from digital controller 16 (FIG. 1). In the preferred embodiment, all of these elements are contained on a single integrated circuit.

Figure 5E:
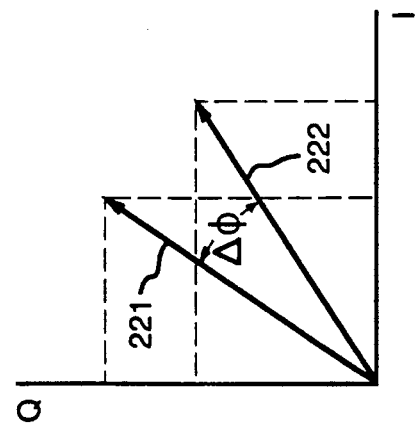
FIGS. 5A-5E are graphical illustrations of the signal at various points in the receiver channel of FIG. 5.
Figure 5B:
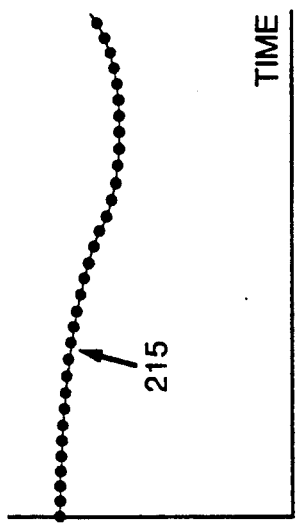
Figure 5D:
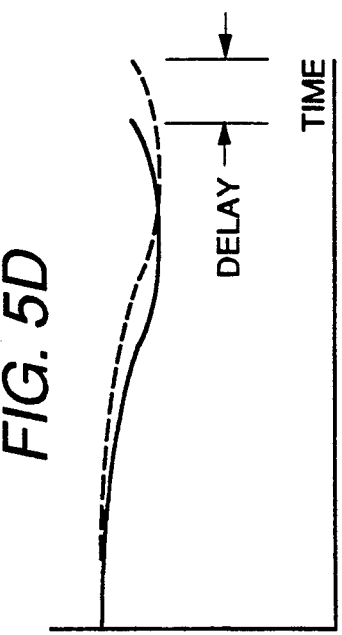
Figure 5A:
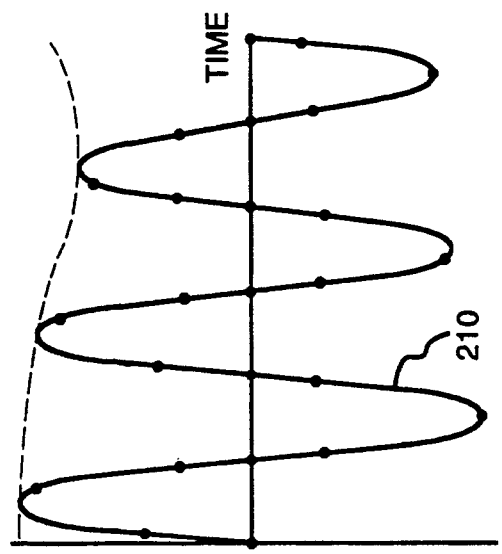

Referring still to FIG. 5, analog-to-digital converter 200 samples the analog input signal, indicated graphically by waveform 210 in FIG. 5A, at regular intervals determined by the leading edge of a delayed sample clock signal from receive channel control 206. In the preferred embodiment the sample clock signal is a 40 MHz clock signal to enable use of ultrasonic frequencies up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are supplied to demodulator 201 which mixes each sample with both a reference in-phase with the transmitted ultrasonic carrier, and with a reference in quadrature with the transmitted ultrasonic carrier. The demodulator reference signals are produced from stored SINE and COSINE tables that are read out of their respective ROM memories by a 40 MHz reference clock signal from receive channel control signal 206. The SINE value is digitally multiplied by the sampled input signal to produce a demodulated, in-phase value (I) supplied to low pass filter 202, and the COSINE value is digitally multiplied by the same sampled input signal to produce a demodulated, quadrature phase value Q signal supplied to a separate low pass filter 202. The low pass filters 202 are finite impulse response filters tuned to pass the difference frequencies supplied by demodulator 201, but block the higher, sum frequencies. As shown by waveform 215 in the graph of FIG. 5B, the output signal of each low pass filter is, therefore, a 40 MHz stream of digital values which indicate the magnitude of the I or Q component of the echo signal envelope.

For a detailed description of an analog-to-digital converter, demodulator, and a low pass filter circuit reference is made to commonly assigned U.S. Pat. No. 4,839,652 which issued June 13, 1989 and is entitled "Method and Apparatus For High Speed Digital Phased Array Coherent Imaging System".

Figure 5C:
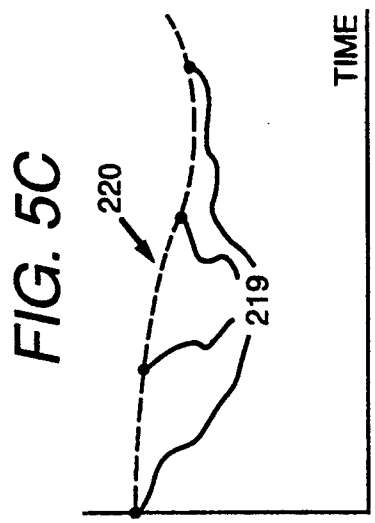

Referring still to FIG. 5, the rate at which the demodulated I and Q components of the echo signal are sampled is reduced by decimators 203. The 12-bit digital samples are supplied to the decimators at a 40 MHz rate which is unnecessarily high from an accuracy standpoint, and which is a difficult data rate to maintain throughout the system. Accordingly, decimators 203 select every eighth digital sample to reduce the data rate down to a 5 MHz rate. This corresponds to the frequency of a baseband clock signal produced by receive channel control 206 and employed to operate the remaining elements in the receiver channel. The I and Q output signals of decimators 203 are thus digitized samples 219 of the echo signal envelope indicated by dashed line 220 in the graph of FIG. 5C. The decimation ratio and the baseband clock frequency can be changed to values other than 8:1 and 5 MHz.

The echo signal envelope represented by the demodulated and decimated digital samples is then delayed by delay FIFOs 204 and phase rotator 205 to provide the desired beam steering and beam focusing. These delays are in addition to the coarse delays provided by the timing of the delayed sample clock signal which is applied to analog-to-digital converter 200 as described above. That is, the total delay provided by receiver channel 110 is the sum of the delays provided by the delayed sample clock signal supplied to analog-to-digital converter 200, the delay FIFOs 204 and the phase rotator 205. The delay FIFOs 204 are memory devices into which the successive digital sample values are written as they are produced by decimators 203 at a rate of 5 MHz. These stored values are written into successive memory addresses and then read from the memory device and supplied to phase rotator 205. The amount of delay, illustrated graphically in FIG. 5D, is determined by the difference between the memory location from which the digital sample is currently being supplied and the memory location into which the currently received digital sample is being stored. The 5 MHz baseband clock signal establishes 200 nanosecond intervals between stored digital samples and FIFOs 204 can, therefore, provide a time delay measured in 200 nanosecond increments up to their maximum of 25.6 microseconds. Phase rotators 205 enable the digitized representation of the echo signal to be delayed by amounts less than the 200 nanosecond resolution of delay FIFOs 204. The I and Q digital samples supplied to phase rotator 205 may be represented, as shown in FIG. 5E, by a phasor 221 and the rotated I and Q digital samples produced by phase rotator 205 may be represented by a phasor 222. The magnitudes of the phasors (i.e. the vector sum of the I and Q components of each) are not changed, but the I and Q values are changed with respect to one another such that the output phasor 222 is rotated by an amount $\Delta\theta$ from the input phasor 221. The phase can be either advanced ($+\Delta\phi$) or delayed ($-\Delta\phi$) in response to a phase control signal received on a bus from receive channel control 206. For a detailed description of the phase rotator 205, reference is made to commonly assigned U.S. Pat. No. 4,896,287 which issued on Jan. 23, 1990 and is entitled "Cordic Complex Multiplier" and is incorporated herein by reference.

For a general description of receiver channel 110 and a detailed description of how the I and Q output signals of each receiver channel 110 are summed together to form a beam signal, reference is also made to commonly assigned U.S. Pat. No. 4,983,970 which issued on Jan. 8, 1991 and is entitled "Method and Apparatus For Digital Phased Array Imaging", and is incorporated herein by reference.

Figure 6:
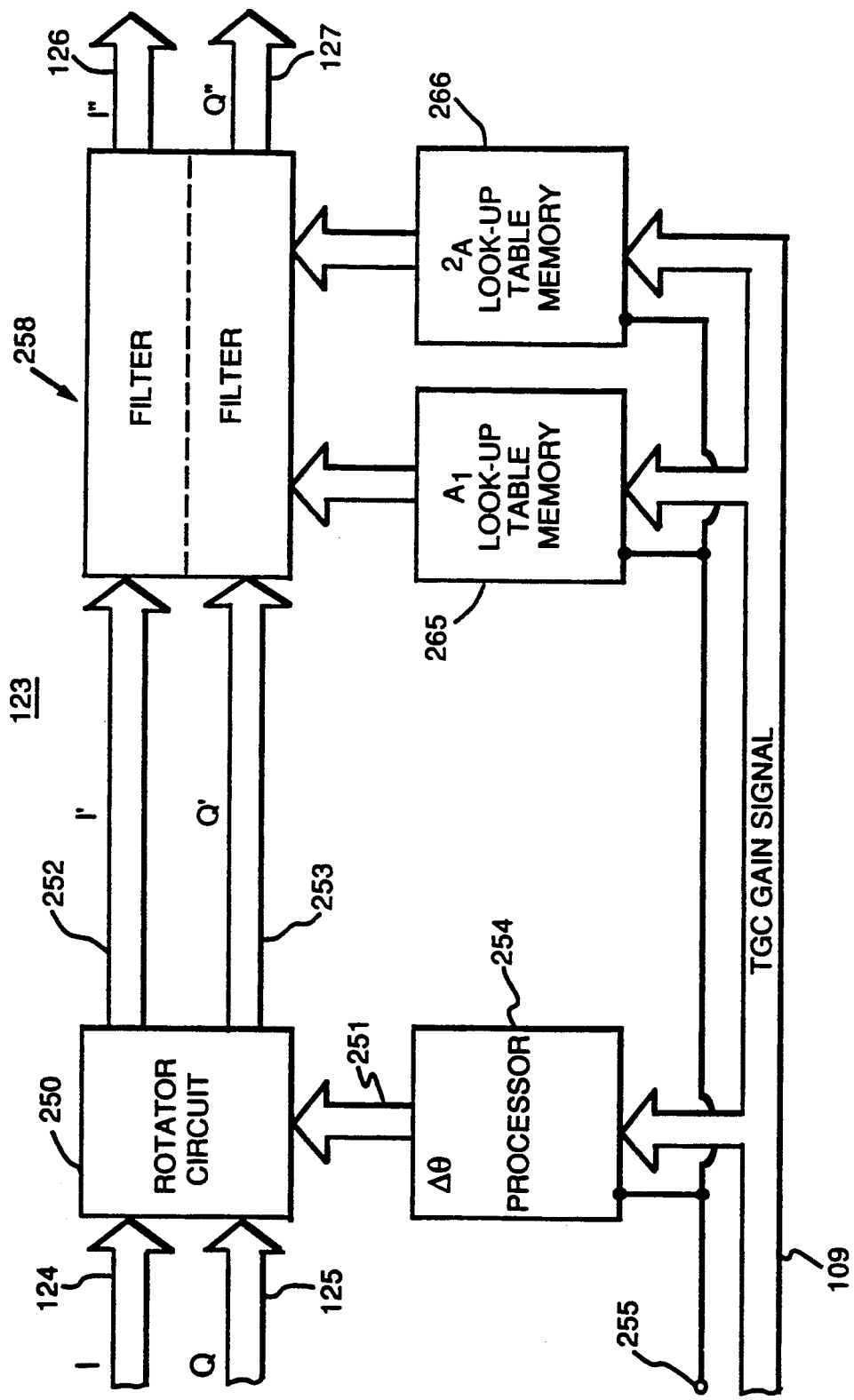
FIG. 6 is an electrical block diagram of a preferred embodiment of the time frequency control filter of the present invention.

In FIG. 6, TFC filter 123 which embodies the present invention, is shown to include a rotator circuit 250 which has its inputs 124 and 125 connected to receive the respective I and Q beam samples. Rotator circuit 250 is identical to that described above and disclosed in the above-cited U.S. Pat. No. 4,896,287. It receives a digital phase shift command ($\Delta\theta$) at an input 251 as each I and Q digital beam sample is received at its inputs 124 and 125. The phasor represented by the I and Q input components is rotated by an amount $\Delta\theta$ and the components of the resulting, rotated phasor are produced as I' and Q' signals on buses 252 and 253.

The digital phase shift command ($\Delta\theta$) is produced by a $\Delta\theta$ processor 254. The TGC gain signal on bus 109 is applied to address leads on processor 254 and the data stored at the addressed memory location is read out and employed to calculate the phase shift command $\Delta\theta$ for rotator circuit 250 when the signal on control line 255 from a read clock (not shown) goes low. The value of the digital phase shift command ($\Delta\theta$) is thus a function of the TGC gain signal as will be explained in more detail below.

TFC filter 123 also includes a bandpass filter 258 which adjusts the relative amplitude of the frequency components in the I' and Q' signals produced by rotator circuit 250. At short ranges where the total signal loss is small and there is a good signal-to-noise ratio, the rotated I' and Q' signal components of the echo signal are each high-pass filtered so that the entire bandwidth is used to form the image. This results in improved image resolution, especially in the lateral dimension. In contrast, at longer ranges where the total signal loss is large and there is poor signal-to-noise ratio, the rotated I' and Q' signal components of the echo signal are each low-pass filtered so that the bandwidth of the signals contributing to the image at long ranges is reduced. This filtering improves penetration, since the noise bandwidth is reduced at longer ranges at the expense of axial image resolution.

Figure 7:
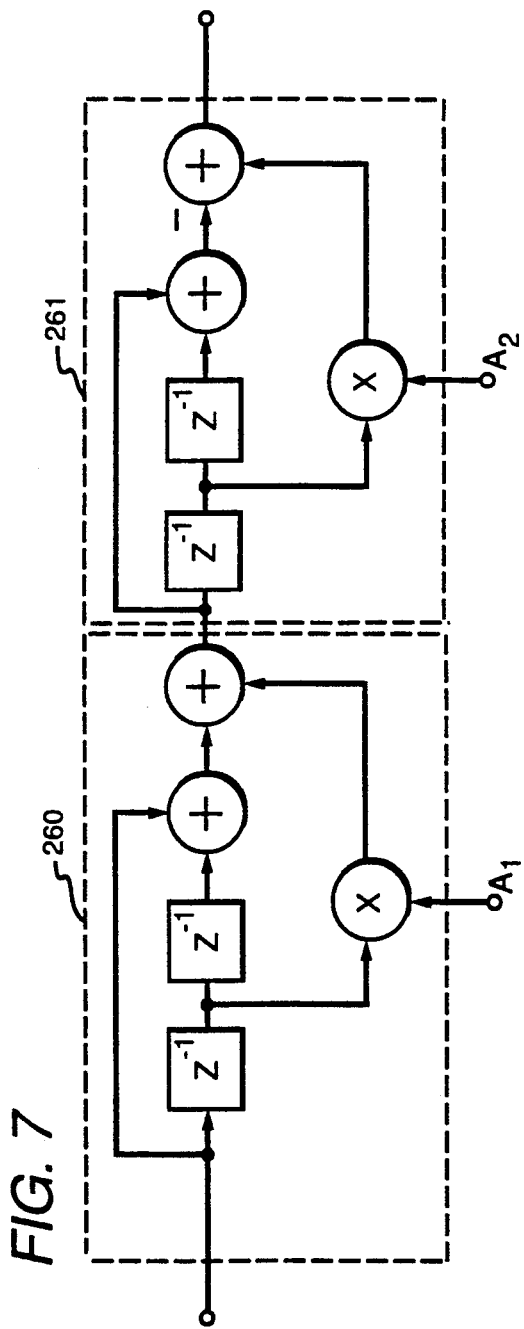
FIG. 7 is a schematic diagram of the bandpass filter which forms part of the time frequency control filter of FIG. 6.

The circuit for performing these filtering operations is shown in FIG. 7, where the first stage 260 comprises a low pass filter and the second stage 261 comprises a high pass filter. The blocks identified as $Z^{-1}$ represent unit delays, while the symbols + and x indicate adders and multipliers, respectively. Filters 260 and 261 are conventional finite impulse response digital filters with the low pass filter 260 having an impulse response (1, $A_1$, 1) and the high pass filter having an impulse response ($-1$, $A_2$, $-1$). On each clock cycle, a new data value is supplied to filter 260. Delays are implemented using clocked registers, where data are transferred from register to register at every clock edge. Within a clock cycle, all mathematical operations (i.e., additions or mutliplication) are performed. The low pass filter 260 with impulse response (1, $A_1$, 1) performs two additions and one multiplication during any given clock period. Data entering the filter are added to data which arrived at the filter input two clock cycles previously. The resultant output signal of this operation is added to the filter input signal at one clock cycle previous, modified by multiplication with the coefficient $A_1$. Again, all mathematical operations are performed during a single clock period so that for each input signal to the filter, there is an output signal (i.e., pipeline implementation). The output signal of the low pass filter 260 is piped into the input of the high pass filter 261 resulting in a pipelined bandpass filter, where the filter characteristics are controlled solely by the coice of coefficients $A_1$ and $A_2$. At short ranges, the coefficient $A_1$ of low pass filter 260 is increased substantially over the coefficient $A_2$ of high pass filter 261 so that high pass filter 261 will dominate the filter response in the near field. On the other hand, at long ranges the coefficient $A_2$ of high pass filter 261 is increased substantially above the coefficient $A_1$ of low pass filter 260 such that the response of filter 258 (FIG. 6) is dominated by low pass filter 260. In the preferred embodiment, ultrasonic transducer 11 produces pulses at a carrier frequency of 5 MHz with a bandwidth of approximately 2 MHz and a Gaussian energy distribution over that bandwidth. Filters 260 and 261 are conventional three point FIR filters where the single coefficient $A_1$ determines the low pass frequency characteristics and the single coefficient $A_2$ determines the high pass frequency characteristics. The specific choice of coefficients $A_1$ and $A_2$ is determined by the bandwidth of the ultrasonic pulse being used in accordance with standard teachings as described, for example, on pages 237-269 of *Digital Signal Processing*, authored by Oppenheim and Schafer and published in 1975 by Prentice Hall.

Figure 8:
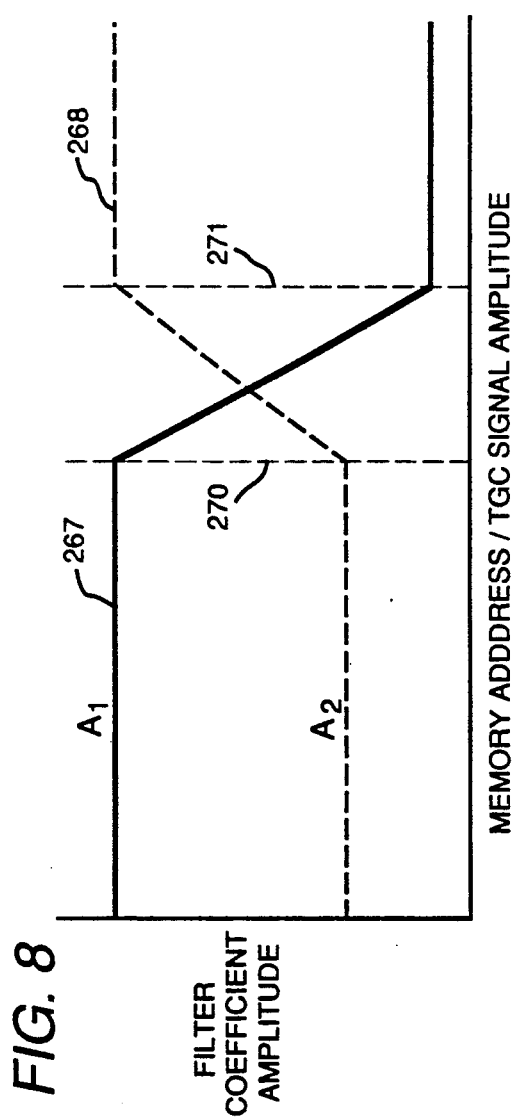
FIG. 8 is a graphic representation of the control signals $A_1$ and $A_2$ employed in the filter of FIG. 7.

Referring again to FIG. 6, an important aspect of the present invention is the realization that the phase shift command for rotator circuit 250 and the coefficient commands $A_1$ and $A_2$ for filters 258 can be produced as a function of the TGC gain signal on bus 109. The coefficient commands $A_1$ and $A_2$ are stored in respective memories 265 and 266 and they are read out of the memories and applied directly to filters 258 by the read clock signal on control line 255. The TGC gain signal bus 109 is connected to the address leads on memories 265 and 266, and the amplitude of the TGC gain signal addresses particular coefficient values $A_1$ and $A_2$ stored at successive memory locations. This is illustrated graphically in FIG. 8, where solid line 267 indicates the value of the coefficients $A_1$ stored in successive addresses of memory 265, and dashed line 268 indicates the value of the coefficients $A_2$ stored in successive addresses of memory 266. At TGC gain amplitudes where all ultrasonic frequency components are above thermal noise levels, the coefficient $A_2$ for high pass filter 261 is minimum and the low pass filter coefficient $A_1$ is at a maximum. At a TGC gain value indicated by dashed line 270, some of the high frequency components are being attenuated below thermal noise levels and the filter begins changing characteristics. At a higher TGC gain value, indicated by dashed line 271, the coefficient $A_1$ of the low pass filter 260 is at a minimum and the coefficient $A_2$ of the high pass filter 261 is at a maximum.

The phase shift command $\Delta\theta$ and the filter bandpass characteristics must be calculated to match the signal spectrum at each echo signal range. Consequently, the control must properly model dispersion effects in the body. In general, the spectrum of the received signal from a range of R can be written as:

$$H(\omega,R) = A(\omega) e^{-2\int_0^R \alpha(\omega,x)dx}, \quad (3)$$

where $A(\omega)$ is the spectrum of the incident ultrasonic pulse in the absence of dispersion, and $\alpha(\omega,x)$ is the frequency dependent attenuation coefficient. In soft tissue it is a good approximation to model the attenuation coefficient as a linear function of frequency, $$\alpha(\omega,x) = \alpha_0(x)\omega. \quad (4)$$

Consequently, the spectrum at range R becomes $$H(\omega,R) = A(\omega) e^{-2\omega \int_0^R \alpha_0(x)dx}. \quad (5)$$

To illustrate some properties of $H(\omega,R)$, assume that the excitation spectrum, $A(\omega)$, is Gaussian so that the spectrum at range R is $$H(\omega, R) = A_0 e^{-(\omega-\omega_0)^2/\sigma^2} e^{-2\omega<\alpha R>}, \quad (6)$$

where $<\alpha R>$ is the range integral of $\alpha_0$. The exponents in Equation 6 can be combined, yielding the product of two terms, one representing a frequency independent loss factor and the second representing a frequency shifted Gaussian. That is, Equation 6 can be rewritten as $$H(\omega, R) = A_0 e^{-(2\omega_0<\alpha R> + <\alpha R>^2\sigma^2)} e^{-(\omega-\omega'_0)^2/\sigma^2}, \quad (7)$$

where $\omega'_0$ is defined as $$\omega'_0 = \omega_0 - <\alpha R>\sigma^2. \quad (8)$$

The frequency independent loss term in Equation 7 is compensated by the TGC function, where the gain in decibels (dB) as a function of range is given by $$G(R) = 8.686 [2\omega_0<\alpha R> - <\alpha R>^2\sigma^2]. \quad (9)$$

Solving Equation 9 for $<\alpha R>$ and incorporating the result into Equation 8, the shift in center frequency of the Gaussian pulse is $$\Delta\omega = \omega_0 - \omega'_0 = \omega_0 - \sqrt{\omega_0^2 - (G(R)/8.686)\sigma^2}. \quad (10)$$

Consequently, the rotator circuit 250 should rotate the phase of the echo signal by an angle $\Delta\theta$ at each sample i to account for dispersion effects, where the angle is $$\Delta\theta_i = \Delta\omega T_0 + \Delta\theta_{i-1}, \quad (11)$$

and $\Delta\omega$ is defined in Equation 10. From the analysis above, it is clear that the phase shift command $\Delta\theta$ is a function of the TGC gain for a Gaussian excitation spectrum. In general, this command will be a smooth function of the TGC gain for any realistic excitation spectrum. Thus, a look-up table can be used to calculate the $\Delta\theta$ command for a given value of the TGC gain.

Figure 9:
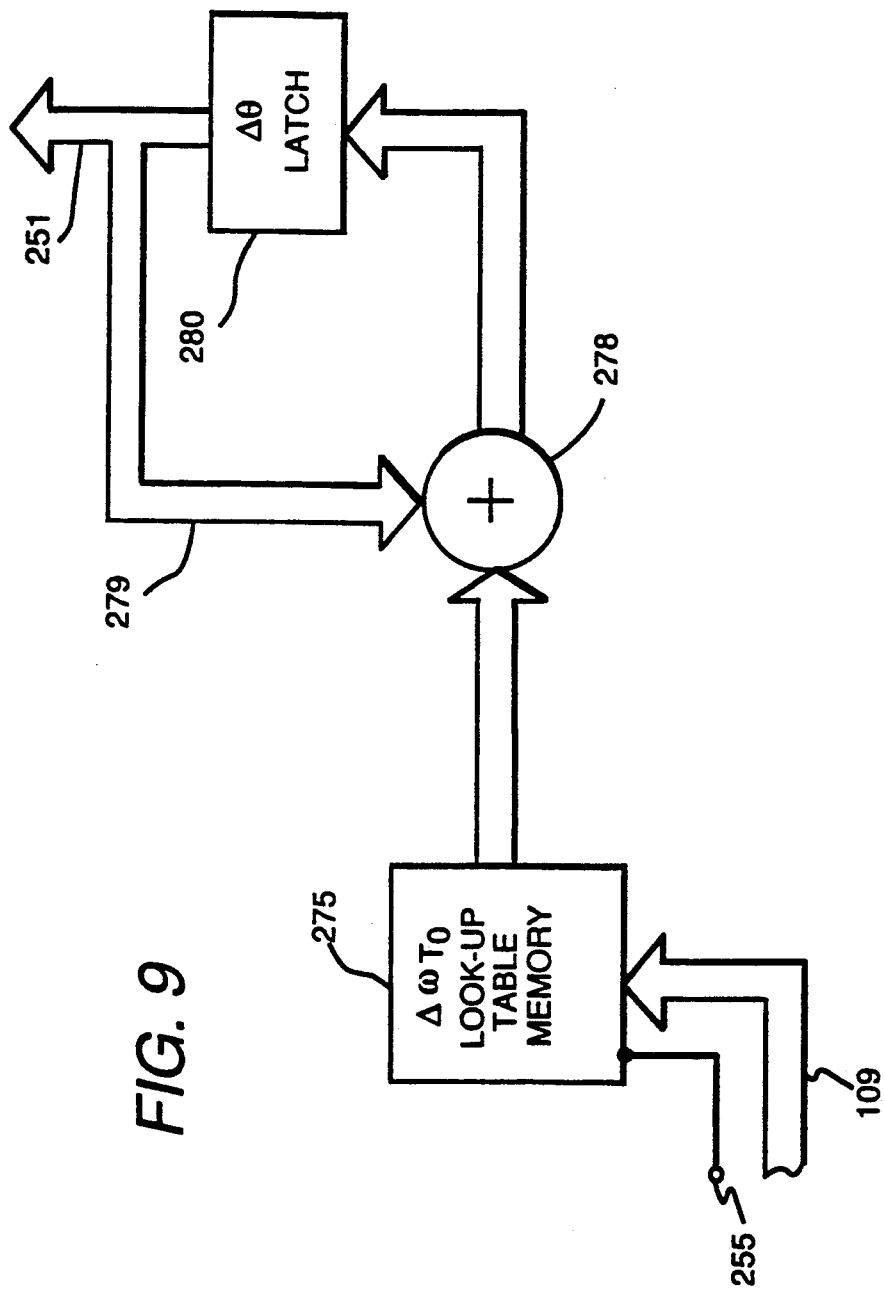
FIG. 9 is a schematic diagram of the $\Delta\theta$ processor which forms part of the time frequency control filter of FIG. 6.

The circuit for the $\Delta\theta$ processor 254 (FIG. 6) is shown in FIG. 9 and includes a $\Delta\omega T_0$ look-up table memory 275 which stores values for $\Delta\omega T_0$ at each of its addressable locations. TGC gain bus 109 connects to the address leads on this memory 275 and when the read clock signal on control line 255 goes low, a value for $\Delta\omega T_0$ is read from memory 275. The output signal of look-up table memory 275 represents the angle by which the present sample (i) of the echo signal should be advanced relative to the previous sample (i−1) and it is applied to one set of inputs on a digital adder 278. The other set of inputs 279 on adder 278 are driven by the phase shift command $\Delta\theta_{i-1}$ computed for the previous echo signal sample, stored in a latch 280. Since the phase shift command is a circular function, adder 278 can be a modulo based adder, where the total number bits at both inputs as well as the adder output equals the total number of bits needed to uniquely specify an independent phase shift command for the phase rotator. The output signal of adder 278, which constitutes the new phase shift command $\Delta\theta_i$ for the present sample, is stored in latch 280 and applied through bus 251 to rotator circuit 250 (FIG. 6).

The time frequency control filter of the present invention is easily implemented in the mid processor and applied to the formed receive beam. Its structure is simplified considerably by deriving the control parameters for the filter as a function of the TGC gain signal, an existing signal in ultrasonic imaging systems. It should be apparent to those skilled in the art that many variations are possible from the preferred embodiment of the invention described herein without departing from the spirit of the invention. It is, therefore, to be understood that the appended claims are intended to cover all such modifications and changes.

What is claimed is:

1. In a coherent imaging system using vibratory energy for producing a series of digital samples of a reflected (echo) signal and for producing a time gain control signal for indicating the amount by which each echo signal digital sample has been amplified to compensate for dispersion losses, a time frequency control filter comprising:
   a phase rotator for receiving, at baseband, the digital samples of the echo signal and imparting a phase shift thereto in response to a phase shift command signal; and
   a phase shift command processor for calculating a phase shift command signal for the phase rotator as a function of amplitude of the time gain control signal.

2. The time frequency control filter of claim 1 wherein the phase shift command processor includes an addressable look-up table memory for storing at addressable memory locations therein corrective values for determining the phase shift command signal, and wherein one of said addressable memory locations is selectable by said time gain control signal.

3. The time frequency control filter of claim 1 including a bandpass filter, wherein the coefficients of the filter are controlled as a function of amplitude of said time gain control signal.

4. The time frequency control filter of claim 3 wherein the bandpass filter is comprised of a low pass filter and a high pass filter, said bandpass filter being coupled to said phase rotator so as to receive the digital samples of the echo signal from said phase rotator, the characteristics of the low pass filter and the high pass filter being separately controlled as a function of amplitude of the time gain control signal.

5. The time frequency control filter of claim 3 wherein the bandpass filter includes:
   a first coefficient look-up table memory for storing coefficient values for the low pass filter at separately addressable memory locations, one of said addressable memory locations in the first coefficient look-up table memory being selectable by the time gain control signal; and
   a second coefficient look-up table memory for storing coefficient values for the high pass filter at separately addressable memory locations, one of said addressable memory locations in the second coefficient look-up table memory being selectable by the time gain control signal.

6. In a coherent imaging system using ultrasonic echo signals for producing a series of digital samples of a reflected (echo) signal and for producing a time gain control signal for indicating the amount by which each echo signal digital sample has been amplified to compensate for dispersion losses, a time frequency control filter comprising:
   a phase rotator for receiving, at baseband, the digital samples of the ultrasonic echo signal and imparting a phase shift thereto in response to a phase shift command signal; and
   a phase shift command processor for calculating a phase shift command signal for the phase rotator as a function of amplitude of the time gain control signal.

7. The time frequency control filter of claim 6 wherein the phase shift command processor includes an addressable look-up table memory for storing at addressable memory locations therein corrective values for determining the phase shift command signal, and wherein one of said addressable memory locations is selectable by said time gain control signal.

8. The time frequency control filter of claim 6 including a bandpass filter, wherein the coefficients of the filter are controlled as a function of amplitude of said time gain control signal.

9. The time frequency control filter of claim 8 wherein the bandpass filter is comprised of a low pass filter and a high pass filter, said bandpass filter being coupled to said phase rotator so as to receive the digital samples of the ultrasonic echo signal from said phase rotator, the characteristics of the low pass filter and the high pass filter being separately controlled as a function of amplitude of the time gain control signal.

10. The time frequency control filter of claim 8 wherein the bandpass filter includes:
    a first coefficient look-up table memory for storing coefficient values for the low pass filter at separately addressable memory locations, one of said addressable memory locations in the first coefficient look-up table memory being selectable by the time gain control signal; and
    a second coefficient look-up table memory for storing coefficient values for the high pass filter at separately addressable memory locations, one of said addressable memory locations in the second coefficient look-up table memory being selectable by the time gain control signal.

* * * * *